United States Patent
Zaman et al.

(10) Patent No.: US 11,032,081 B1
(45) Date of Patent: Jun. 8, 2021

(54) SYSTEM AND METHOD FOR AUTHORIZING SECONDARY USERS TO ACCESS A PRIMARY USER'S ACCOUNT USING BLOCKCHAIN

(71) Applicant: Capital One Services, LLC, McLean, VA (US)

(72) Inventors: Saira Zaman, Frisco, TX (US); Salim Memon, Richardson, TX (US)

(73) Assignee: Capital One Services, LLC, McLean, VA (US)

( * ) Notice: Subject to any disclaimer, the term of this patent is extended or adjusted under 35 U.S.C. 154(b) by 25 days.

(21) Appl. No.: 16/707,772

(22) Filed: Dec. 9, 2019

(51) Int. Cl.
| | |
|---|---|
| H04L 9/32 | (2006.01) |
| H04L 29/06 | (2006.01) |
| G06F 21/62 | (2013.01) |
| G06Q 20/40 | (2012.01) |

(52) U.S. Cl.
CPC ........ *H04L 9/3236* (2013.01); *G06F 21/6245* (2013.01); *H04L 63/102* (2013.01); *H04L 63/105* (2013.01); *G06Q 20/401* (2013.01); *H04L 2209/38* (2013.01)

(58) Field of Classification Search
CPC ... H04L 9/3236; H04L 63/105; H04L 63/102; H04L 2209/38; G06F 21/6245; G06Q 20/401
See application file for complete search history.

(56) References Cited

U.S. PATENT DOCUMENTS

| | | | |
|---|---|---|---|
| 2019/0034922 A1* | 1/2019 | Castinado | ............. G06F 16/182 |
| 2019/0124118 A1 | 4/2019 | Swafford | |
| 2019/0205563 A1 | 7/2019 | Gonzales, Jr. | |
| 2019/0208418 A1 | 7/2019 | Breu | |
| 2019/0238525 A1* | 8/2019 | Padmanabhan | ..... G06F 21/6245 |
| 2019/0281026 A1* | 9/2019 | Mitchell | ................. H04W 4/42 |
| 2019/0379699 A1* | 12/2019 | Katragadda | ......... H04L 63/1425 |

FOREIGN PATENT DOCUMENTS

WO      2019089044 A1    5/2019

* cited by examiner

*Primary Examiner* — Amie C. Lin
(74) *Attorney, Agent, or Firm* — Sterne, Kessler, Goldstein & Fox P.L.L.C.

(57) ABSTRACT

Described herein is a system for authorizing secondary users to access a primary user's account using blockchain. The primary user can transmit a request for providing access to a primary user's account to a secondary user. In response to receiving the request, the system may generate a new block in the blockchain ledger specifying the permissions of the secondary user. Furthermore, the new block may include the permission details. This way, when the secondary user attempts to access the primary user's account, the system may verify the secondary user based on the permission details in the last block in the sequence of blocks. Each new block may include the permission details.

20 Claims, 6 Drawing Sheets

SYSTEM AND METHOD FOR AUTHORIZING SECONDARY USERS TO ACCESS A PRIMARY USER'S ACCOUNT USING BLOCKCHAIN

BACKGROUND

In a blockchain storage system, multiple different computing nodes store a copy of a blockchain ledger represented by a sequence of blocks. Each block is generated in response to an event(s). Each block stores the data of the event(s), a timestamp of the block creation, and a hash value from the data of the previous block in the sequence of blocks. Each time an action (e.g., addition of new block) to the sequence of blocks is to be executed, the catalyst event is broadcast to each of the computing nodes. The computing nodes verify the event based on the data stored in their copy of the blockchain ledger. In response to verification of the event from the computing nodes, the action to the sequence of blocks is executed.

Conventionally, entities such as educational institutions, financial institutions, email accounts, social media companies, utility companies, automobile companies, mortgage companies, or the like, store and manage accounts for users such as a primary user and secondary user. For example, the primary user may provide access to a secondary user for accessing the primary user's account in the following scenarios: a primary user is traveling with limited ability to access their account, the primary user expects to have medical issues that limit their ability to access their account, the primary user has limited network connectivity, the secondary user may be tasked to complete certain transactions for the primary user, or any other reason the primary user may have limited access to their account.

These entities may use relational databases to manage authentication and permission details for the accounts. However, there is no way of knowing whether the data stored in a relational database is updated or accurate. This may be error-prone and computationally expensive as the relational database will have to be manually updated each time the authentication or permission data changes. Additionally, relational databases may not be as secure as data may be manipulated easily.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Described herein is a system for authorizing secondary users to access a primary user's account using blockchain. A primary user may have a user account tied to various types of institutions (e.g., primary user may be a primary account holder of an account). For example, the primary user may have a user account for an educational institution, financial institution, email account, social media account, utility payment account, automobile loan payment account, mortgage account, or the like. The primary user may have permanent read and write access permissions for this account. The read and write permissions may allow the primary account user to view transactions of the account as well as execute actions that may affect the account. For example, the primary user may have an account with a financial institution such as a bank. The primary user may have permissions to view the statement balances, as well as deposit, transfer, or withdraw money.

The primary user's account may be implemented using a cryptographically verifiable ledger or a blockchain ledger. As described above, the blockchain ledger may be made up of a sequence of blocks. Each block may be generated in response to one or more events. The block may store transaction details of the event and a hash value of the previous block previous block. The transaction details may include account information, such as name, address, account type, email address, phone number, and/or the like. The transaction details may also include the primary user's unique identifier. The unique identifier may be a social security number, account user name, and/or the like. The primary user's unique identifier may be encrypted to generate a hash identifier. The block may also store a timestamp of when the event occurred. Each account may be tied to a particular sequence of blocks in the blockchain ledger. The blockchain ledger can include multiple sequences of blocks. An event may be a transaction that has occurred in the account. A block can store information about multiple transactions. Continuing with the above example, in the event the primary user's account is an account with a bank, an event may be viewing a balance, deposit, transfer, or withdrawal. Therefore, data associated with each viewing of the balance, deposit, transfer, or withdrawal may be stored in a block of a sequence of blocks.

A copy of the blockchain ledger is stored by multiple computing nodes. The computing nodes may be referred to as a network of computing nodes. The network of computing nodes may include computing nodes distributed in a public, private, or a combination of public and private environment. Each time an event occurs on the primary user's account, the event is broadcast to a network of computing nodes for verification that the data of the event is accurate.

The system may provide a technical advantage of securely and efficiently providing access to a primary user's account to a secondary user. The system may also automatically remove access after a specified period of time. In this way, if a primary user needs a secondary user to monitor or execute actions with the primary user's account for a specified period of time, the system can allow the primary user to provide this access and specify the permissions for the secondary user.

The primary user can transmit a request for providing access to a primary user's account to a secondary user. In response to receiving the request, the system may generate a new block in the blockchain ledger indicating the primary user granting access to the secondary user. In one embodiment, the block may include the transaction details of the primary user granting access to the secondary user. The new block may include the primary and secondary user's unique identifiers. It can be appreciated that the primary user may provide access to multiple secondary users. Both unique identifiers may be encrypted resulting in a primary user's identifier hash, and a secondary user's identifier hash. The type of permissions (e.g., read or write) may also be in included in the block.

When the secondary user attempts to access the primary user's account, the system may verify the secondary user based on the secondary user's identifier hash value in the last block in the sequence of blocks. When the secondary user's permission is revoked due to an action taken by the primary user or after a specified period of time, the secondary user's hash identifier will no longer be included in the transaction details of the blocks.

The system described herein provides a secure and efficient way of granting access for accessing a primary user's account to a secondary user and authenticating the secondary user. In this regard, the system described herein provides a technical solution over conventional systems by using blockchain to grant access for accessing a primary user's account to a secondary user and to authenticate the secondary user so that the most up-to-date information is stored in the blockchain ledger and constantly verified.

Figure 1:
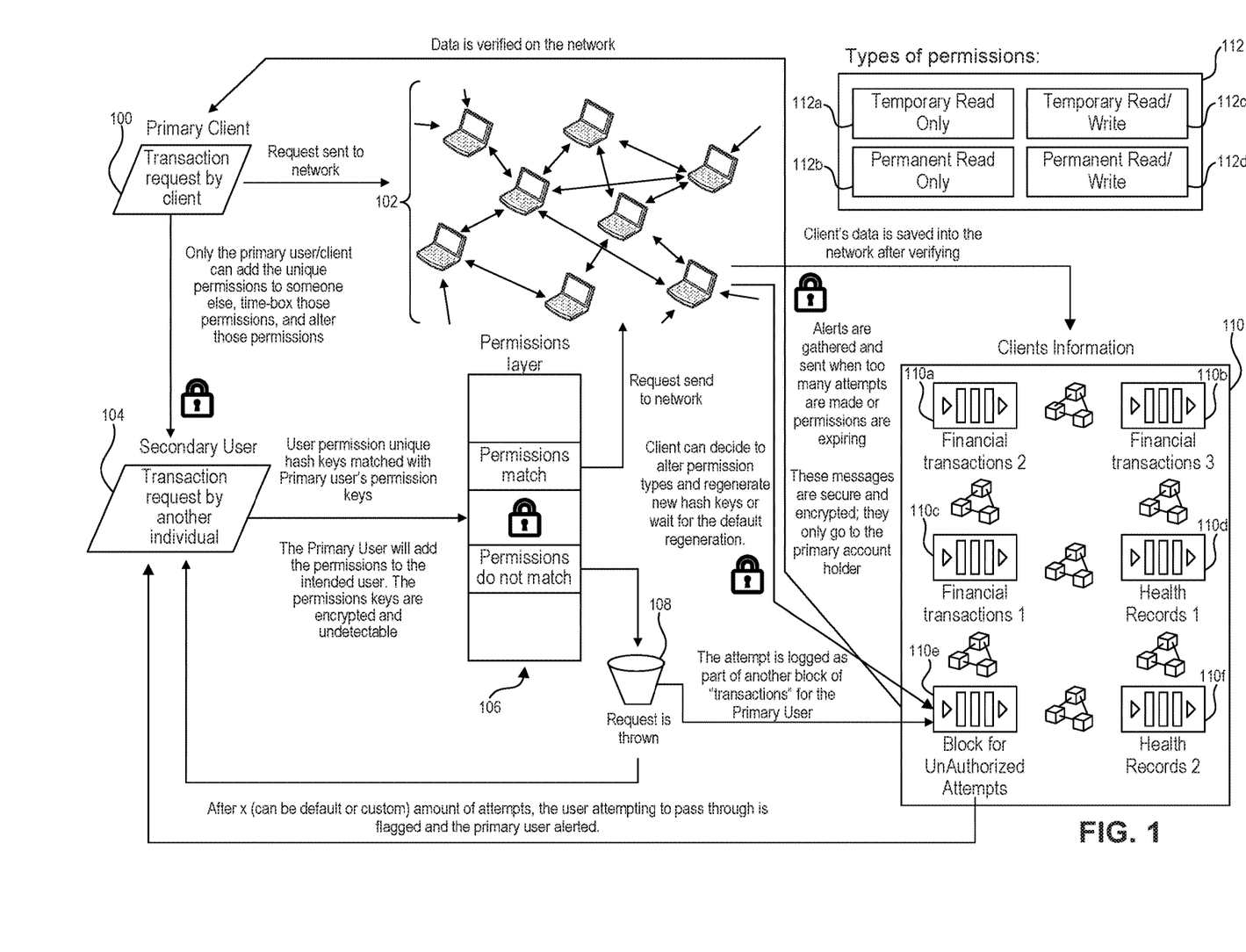
FIG. 1 is a block diagram illustrating a system for authorizing secondary users to access a primary user's account according to some embodiments.

FIG. 1 is a block diagram illustrating a system for authorizing secondary users to access a primary user's account according to some embodiments. In operation 100, a primary user may transmit a permission transmission request. The permission transmission request may be a request for adding, altering, or removing permission for a secondary user to access the primary user's account. The request may include the secondary user's authentication details such as an account username, types of permissions 112, a time-box (e.g., amount of time the secondary user has permissions to access the primary user's account), or the like. Types of permissions 112 may include temporary read-only 112a, permanent read-only 112b, temporary read/write 112c, and permanent read/write 112d. The request may be broadcast to network of computing nodes 102 to verify whether the data of the request is accurate. Each or a majority of network of computing nodes 102 may verify the accuracy of the data of the request by reviewing the data in the last block of the sequence of blocks. For example, in the event the request is for altering the secondary user's permissions, network computing nodes 102 may verify the secondary user's current set of permissions.

In the event network of computing nodes 102 verifies the request, a new block in the blockchain ledger is generated. In one embodiment, the new block includes transaction details such as the permissions granted, altered, or removed for the secondary user, including any other data associated with the permissions, a hash value of the previous block, primary user account information, a primary user's hash identifier (i.e., encrypted unique identifier), and a secondary user's hash identifier (i.e., encrypted unique identifier). In the event permission to access the primary user's account is completely removed for the secondary user, the secondary user's hash identifier may be removed from the transaction details. The primary user's hash identifier and secondary user's hash identifier may be referred to as permission keys. The permission keys may be encrypted and undetectable. The permission keys may be modified based on altering, adding, or removing permissions for a secondary user. The permissions data may be modified based on updating, removing or adding permissions, associating those changes with the correct permission key for a given secondary user, and storing this information in a new block, without modifying anything in the previous block.

In operation 104, the secondary user may attempt to access the primary user's account by submitting a transaction request. The request may be forwarded to the permissions layer 106, which checks whether the secondary user has access to execute the transaction with the primary user's account based on the permission keys of the last block of the blockchain. For example, permissions layer 106 may decrypt the primary user's hash identifier and secondary user's hash identifier, resulting in the primary and secondary users' respective unique identifier. Permissions layer 106 may verify the primary user's unique identifier, secondary user's unique identifier, types of permissions 112 and time-box information in the transaction details of the last block in the blockchain ledger.

In response to verifying the permissions of the secondary user, the permissions layer 106 may broadcast the secondary user's transaction request to network of computing nodes 102. Network of computing nodes 102 may verify the permissions of the secondary user by verifying the permission keys in the last block of the blockchain ledger in their copy of the ledger. In response to network of computing nodes 102 verifying the secondary user, the secondary user may access the primary user's account information 110 to execute the transaction request. As a non-limiting example, the primary user's information 110 may include financial transactions 1-3 110a-c, health records 1-2 110d and 110f, and blocks for unauthorized attempts 110e.

In response to the permissions layer 106 or the network of nodes 102 failing to verify the permissions of the secondary user to execute the transaction request, the request may be discarded in operation 108. A new block may be generated in the blockchain indicating an unauthorized attempt. The new block may be referred to as a block for unauthorized attempts 110e. The new block may also include the secondary user's hash identifier. An alert indicating the unauthorized attempt to access the primary user's account may be transmitted to a user device of the primary user.

As stated above, types of permissions 112 may include temporary read-only 112a, permanent read-only 112b, temporary read/write 112c, and permanent read/write 112d. Temporary read-only 112a permission may only provide visibility into the primary user's account for a temporary basis. The secondary user may not be able to make any changes to the primary user's account. Continuing with the above example, in the event the primary user's account has an account with a bank and the secondary user has temporary read-only 112a permissions, the secondary user may only be able to view the balance of the account and may not be able to make withdrawals, transfers, or deposits. The temporary read-only 112a permission may only give the secondary user access to the primary user's account for a specified time period (e.g., time-box). Alternatively, permanent read-only 112b permission may only provide visibility into the primary user's account, as described directly above, but without any time limitation.

Temporary read/write 112c permission may provide the ability for the secondary user to make changes to the primary user's account. Continuing with the above example, in the event the primary user's account has an account with a bank and the secondary user has temporary read/write 112c permissions, the secondary user may be able to view the balance of the primary user's account and make withdrawals, transfers, or deposits. The temporary read/write 112c permission may only give the secondary user access to the primary user's account for a specified time period (e.g., time-box). Alternatively, permanent read/write 112d permission may only provide visibility and ability to make changes to the primary user's account, as described directly above, but without any time limitation.

Figure 2:
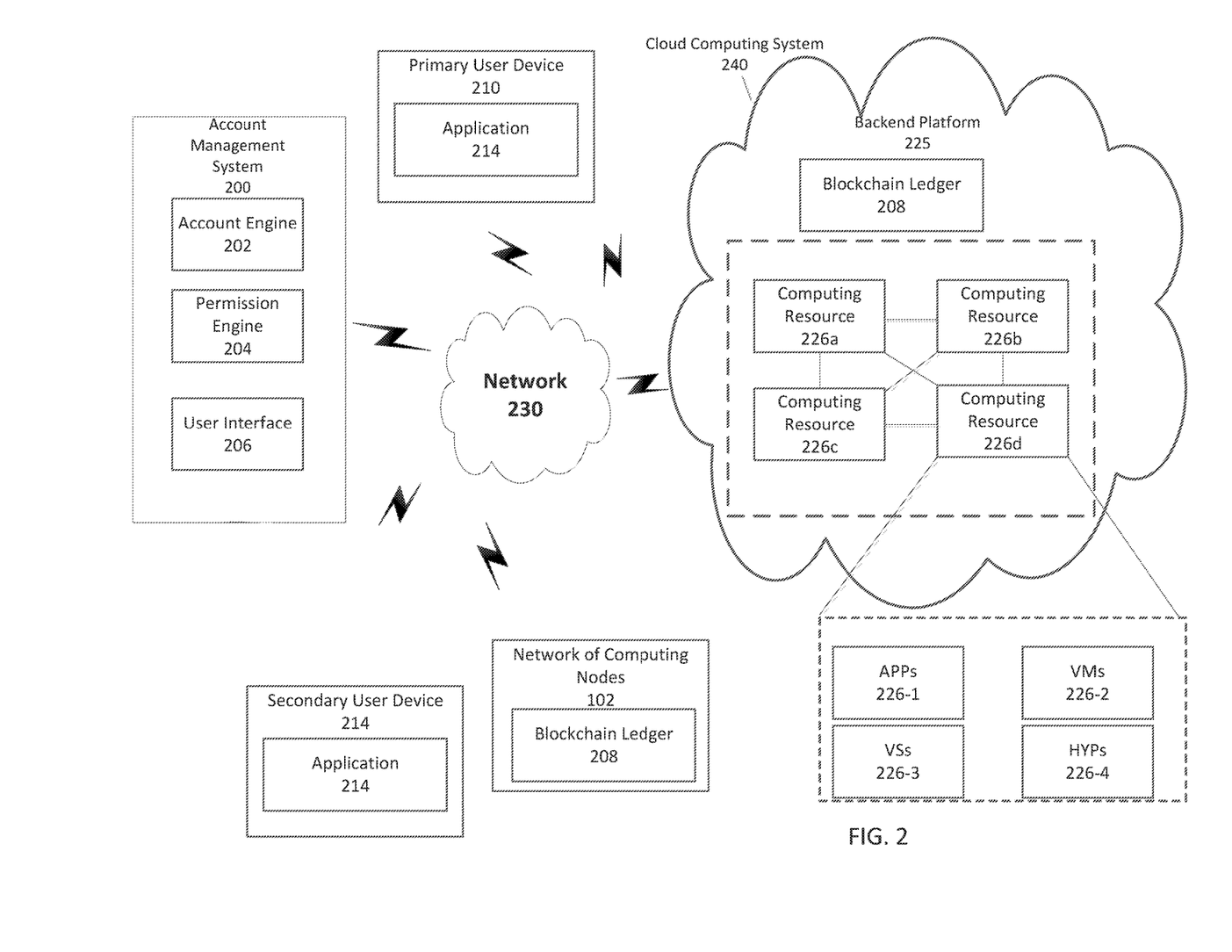
FIG. 2 illustrates an example environment in which systems and/or methods for authorizing secondary users to access a primary user's account according to some embodiments.

FIG. 2 illustrates an example environment for authorizing secondary users to access a primary user's account according to some embodiments. The environment may include an account management system 200, a primary user device 210, a secondary user device 212, and network of computing nodes 102. Account management system 200 may include an account engine 202, a permission engine 204, and a user interface 206. Primary user device 210 and secondary user device 212 may include an instance of application 214. Application 214 is configured to interface with account management system 200. Network of computing nodes 102 may include a copy of blockchain ledger 208.

The devices of the environment may be connected through wired connections, wireless connections, or a combination of wired and wireless connections. Account management system 200 and network of computing nodes 102 may reside inside cloud computing system 240. Alternatively, account management system 200 and network of computing nodes 102 may reside outside cloud computing system 240.

In an example embodiment, one or more portions of the network 230 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Backend platform 225 may include a server or a group of servers. The backend platform 225 may include a copy of the blockchain ledger 208. In an embodiment, backend platform 225 may be hosted in a cloud computing system 240. It may be appreciated that backend platform 225 may not be cloud-based, or may be partially cloud-based. In an embodiment, account management system 200 may be hosted in cloud computing system 240. It may be appreciated that account management system 200 may not be cloud-based, or may be partially cloud-based.

Cloud computing system 240 may include an environment that delivers computing as a service, shared resources, services, etc. Cloud computing system 240 may provide computation, software, data access, storage, and/or other services that do not require end-user knowledge of a physical location and configuration of a system and/or a device that delivers the services. Cloud computing system 240 may include computing resources 226.

Each computing resource 226a-d may include one or more personal computers, workstations, computers, server devices, or other types of computation and/or communication devices. Computing resource(s) 226a-d may host backend platform 225. The cloud resources may include compute instances executing in cloud computing resources 226a-d. Cloud computing resources 226a-d may communicate with other cloud computing resources 226a-d via wired connections, wireless connections, or a combination of wired or wireless connections.

Computing resources 226a-d may include a group of cloud resources, such as one or more applications ("APPs") 226-1, one or more virtual machines ("VMs") 226-2, virtualized storage ("VSs") 226-3, and one or more hypervisors ("HYPs") 226-4.

Application 225-1 may include one or more software applications that may be provided to or accessed by primary or secondary user device 210, 212. In an embodiment, application 214 may execute locally on primary or secondary user device 210, 212. Alternatively, the application 226-1 may eliminate a need to install and execute software applications on primary or secondary user device 210, 212. The application 226-1 may include software associated with backend platform 225 and/or any other software configured to be provided across the cloud computing system 240. The application 226-1 may send/receive information from one or more other applications 226-1, via the virtual machine 226-2.

Virtual machine 226-2 may include a software implementation of a machine (e.g., a computer) that executes programs like a physical machine. Virtual machine 226-2 may be either a system virtual machine or a process virtual machine, depending upon the use and degree of correspondence to any real machine by virtual machine 226-2. A system virtual machine may provide a complete system platform that supports execution of a complete operating system (OS). A process virtual machine may execute a single program and may support a single process. The virtual machine 226-2 may execute on behalf of a user (e.g., primary user device 210 or secondary user device 212) and/or on behalf of one or more other backend platforms 225, and may manage infrastructure of cloud computing system 240, such as data management, synchronization, or long duration data transfers.

Virtualized storage 226-3 may include one or more storage systems and/or one or more devices that use virtualization techniques within the storage systems or devices of computing resources 226a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically stored. This may enable optimization of storage use, server consolidation, and/or performance of non-disruptive file migrations.

Hypervisor 226-4 may provide hardware virtualization techniques that allow multiple operations systems (e.g., "guest operating systems") to execute concurrently on a host computer, such as computing resources 226a-d. Hypervisor 226-4 may present a virtual operating platform to the guest operating systems, may manage the execution of the guest operating systems' multiple instances of a variety of operating systems, and may share virtualized hardware resources.

In an embodiment, account management system 200 can manage user accounts for a specific entity. The account information for each user may be stored in a sequence of blocks in blockchain ledger 208. Each user may be tied to a different sequence of blocks within blockchain ledger 208. Account management system 200 may access a copy of blockchain ledger 208 from the backend platform 225. Account management engine may contain a copy of the information required by the user interface rendered by the application 214 which may be obtained from the blockchain ledger. Account engine 202 may interface with the copy of blockchain ledger 208 to retrieve user account information. Permission engine 204 may interface with the copy of blockchain ledger 208 to retrieve permissions of a user.

A primary or secondary user may have an account managed by the account management system 200. The primary user may use primary user device 210 to execute application 214. Upon launching application 214, a primary user may interface with account management system 200 using user interface 206. The secondary user may similarly interface with account management system 200 using secondary user device 212.

Network of computing nodes 102 may store a copy of blockchain ledger 208. Network of computing nodes 102 may be made up of distributed computing devices. Each computing node of network of computing nodes 102 may store a copy of blockchain ledger 208. Each time a new block is generated for the blockchain ledger 208 based on a new event for a particular sequence of blocks, the new event is broadcast to network of computing nodes 102 for verification of the accuracy of the data in the new block. In response to verifying the new block/new event, each copy of blockchain ledger 208 stored in the network of computing nodes 102 or account management system 200 may add the new block to the respective sequence of blocks in the blockchain ledger 208.

As a non-limiting example, account management system 200 may manage accounts for a financial institution such as a bank. The primary and secondary user may have a bank account with the bank. The bank may identify the primary and secondary user using a unique identifier for each respective user. The unique identifier may include a social security number, account username, randomized alphanumeric string, and/or the like. Account management system 200 may manage the primary and secondary user's bank account.

A primary user may use their primary user device 210 to launch application 214. Primary user device 210 may interface with account management system 200 using application 214 and user interface 206. As an example, the primary user may be traveling internationally and may need the secondary user to monitor and execute tasks for the primary user on the primary user's account. A primary user may transmit a request using the application 214 to the account management system 200 to give permissions to the secondary user to access the primary user's account during the period the primary user is traveling.

Account engine 202 may receive the request and retrieve information regarding the primary user's account from the copy of blockchain ledger 208. Account engine 202 may broadcast the request to the network of computing nodes 102 for verification of the primary user's data. In response to verification of the primary user's data, account engine 202 may generate a new block in the sequence of blocks indicating the primary user granting permissions to the secondary user. The new block may include transaction details including the primary user's account information. The new block may further include the primary and secondary users' respective unique identifier. The primary and secondary users' unique identifier may be individually encrypted, resulting in a primary user's hash identifier and a secondary user's hash identifier. The new block may further include permission data for the secondary user. Permission data may include permission type (as described above), time-box (e.g., length of the primary user's travel), or the like. In this example, the primary user may provide temporary read/write permissions 112c to the secondary user. For each one or more transactions executed by the secondary user, each subsequent block will include the primary user's hash identifier and the secondary user's hash identifier. Each copy of blockchain ledger 208 in backend platform 225 or network of computing nodes 102 may generate the new block in the sequence of blocks.

The secondary user may use their secondary user device 212 to launch application 214. Secondary user device 212 may interface with account management system 200 using application 214 and user interface 206. The secondary user may access their own account or the primary user's account using application 214 and user interface 206. In the event the secondary user accesses or performs any action to their own account, account engine 202 may receive the request to access or perform an action to the account and broadcast the new event to the network of computing nodes 102 for verification of the data of the account and event. In response to verification of the data of the account and the event, account engine 202 may generate a new block in the sequence of blocks for the secondary user's account. The new block includes the transaction details related to the event. Each copy of blockchain ledger 208 stored in account management system 200 or network of computing nodes 102 may generate the new block in the sequence of blocks of the secondary user's account.

The secondary user may also transmit a request to view or perform an action to the primary user's account using application 214 and user interface 206. The request may include the secondary user's authentication details. Account engine 202 may receive the request and may determine that a secondary user is attempting to view or perform an action to the primary user's account. Account engine 202 may forward the request to the permissions layer 106. Permissions layer 106 may query the last block of the primary user's account's sequence of blocks to determine whether the secondary user's hash identifier is included in the transaction details of the last block. Permissions layer 106 may extract the secondary user's hash identifier to determine whether the resulting unique identifier matches the secondary user's unique identifier. In response to determining the secondary user has access to the primary user's account based on matching the secondary user's decrypted identifier to the secondary user's unique identifier, permissions layer 106 may retrieve permissions data from the last block. Permissions layer 106 may determine the type of permissions granted to the secondary user and the specified time period for the permissions according to the permissions data.

In an embodiment, permissions layer 106 may decrypt the primary hash identifier and secondary hash identifier, resulting in the primary and secondary user unique identifiers.

In response to permissions layer 106 determining that the secondary user has permission to view or perform an action to the primary user's account, permissions layer 106 may broadcast the determination of the secondary user's permission to the network of computing nodes 102 for verification of the secondary user's permissions. Network of computing nodes 102 may retrieve the hash value and data from the last block of the sequence of blocks of the primary user's account from the copy of blockchain ledger 208. Network of computing nodes 102 may verify the secondary user's permissions based on the hash value in the last block of the sequence of blocks of the primary user's account.

In response to verification of the secondary user's permissions, account engine 202 may provide a view of the primary user's account or execute the action to the primary user's account as requested by the secondary user. Account engine 202 may generate a new block in the sequence of blocks of the primary user's account, including transaction details of the view provided to the secondary user or action executed to the primary user's account. Account engine 202 may broadcast the generation of the new block to network of computing nodes 102. Network of computing nodes may verify the generation of the new block, and in response to verification of the generation of the new block, each copy of blockchain ledger 208 stored in the backend platform 225 or network of computing nodes 102 may generate the new block in the sequence of blocks of the primary user's account. The new block may include the transaction details of the secondary user's view/action and the primary and secondary hash identifiers.

In an embodiment, the secondary user's permissions for accessing the primary user's account may be revoked automatically after the time-box. Additionally, the primary user may also provide limited visibility of the primary user's account to the secondary user. For example, the primary user may request that the secondary user may only view transactions for the past 12 months. In this regard, the secondary user may not be able to view transactions from greater than a year ago. In response to the secondary user's permissions being revoked based on an action taken by the primary user or based on the time box, a new block may be generated including the transaction details of revoking the permissions of the secondary user. The secondary user's hash identifier may not be included in the transaction details so that when the last block is queried to determine which user has access to the primary user's account, only the primary user's hash identifier is included in the transaction details.

Figure 3:
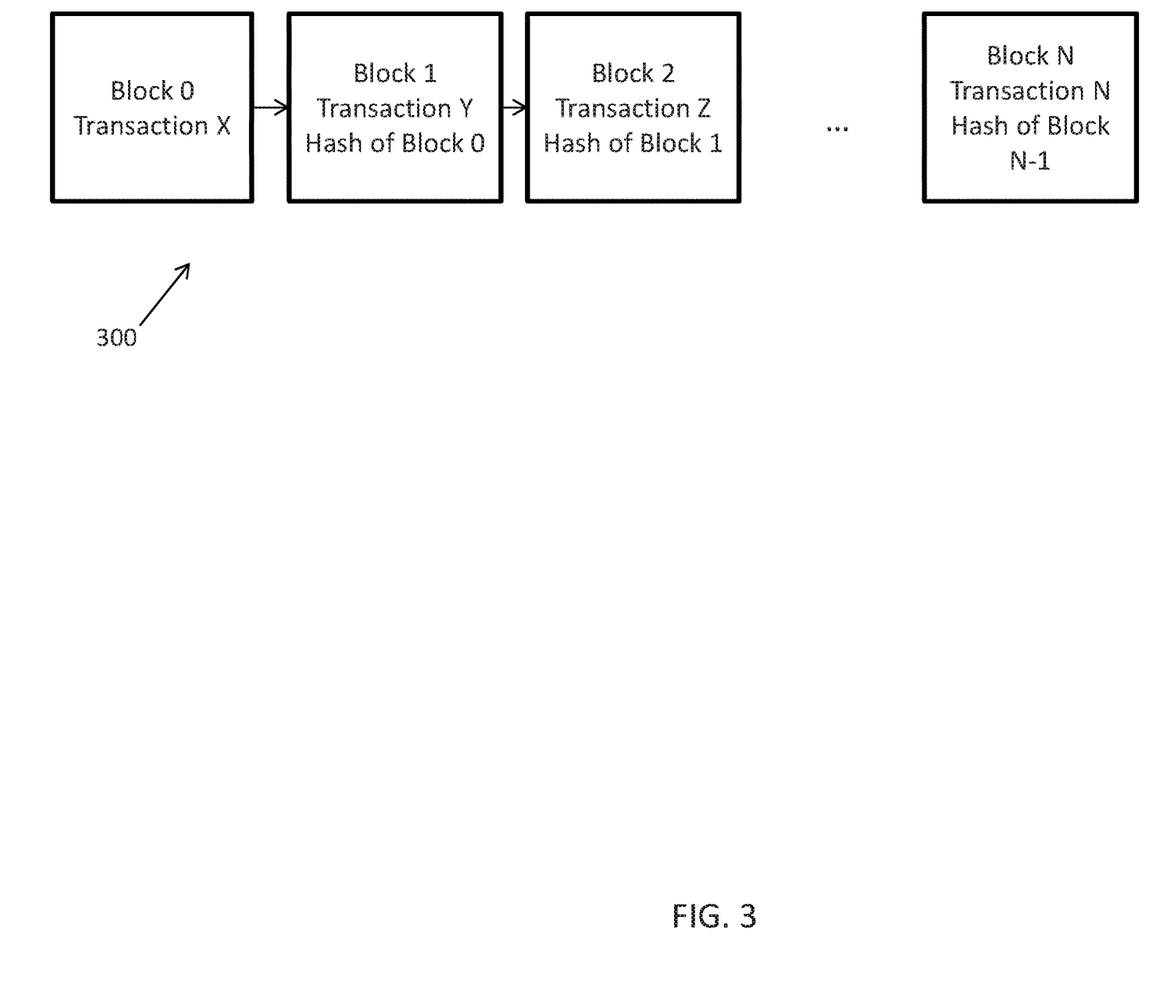
FIG. 3 illustrates an example sequence of blocks in a blockchain ledger.

FIG. 3 illustrates an example sequence of blocks in a blockchain ledger. As stated above, a blockchain ledger may include a sequence of blocks 300. Sequence of blocks may include: block 0, which includes the data of transaction X; block 1, which includes data from transaction Y and a hash value of the data of block 0; block 2, which includes data from transaction Z and a hash value of the data of block 1; and block N, which includes data from transaction N and the hash value of the data of a block previous to block N. As stated above, the transaction details can include the primary user's account information, primary hash identifier and if the secondary user has access to the primary user's account, the secondary user's hash identifier.

Each time sequence of blocks 300 is altered (e.g., adding a new block), the catalyst event is broadcast to the network of computing nodes 102 to verify the event. The network of computing nodes 102 must come to a consensus that the data of the event is accurate and the event is verified. In response to verification of the event, the addition to the sequence of blocks 300 is executed in each copy of the blockchain ledger.

In one embodiment, a proof standard (e.g. proof-of-work, proof-of-stake, proof-of-space, etc.) may be required by the system when validating that sequence of blocks 300 is altered. For example, different computing nodes can be provided with different weights such that different computing nodes have more power to validate an alteration to sequence of blocks 300. This is so that administrators in the network of computing nodes 102 may hold more power for validating alterations of sequence of blocks 300 than the non-administrators.

Figure 4:
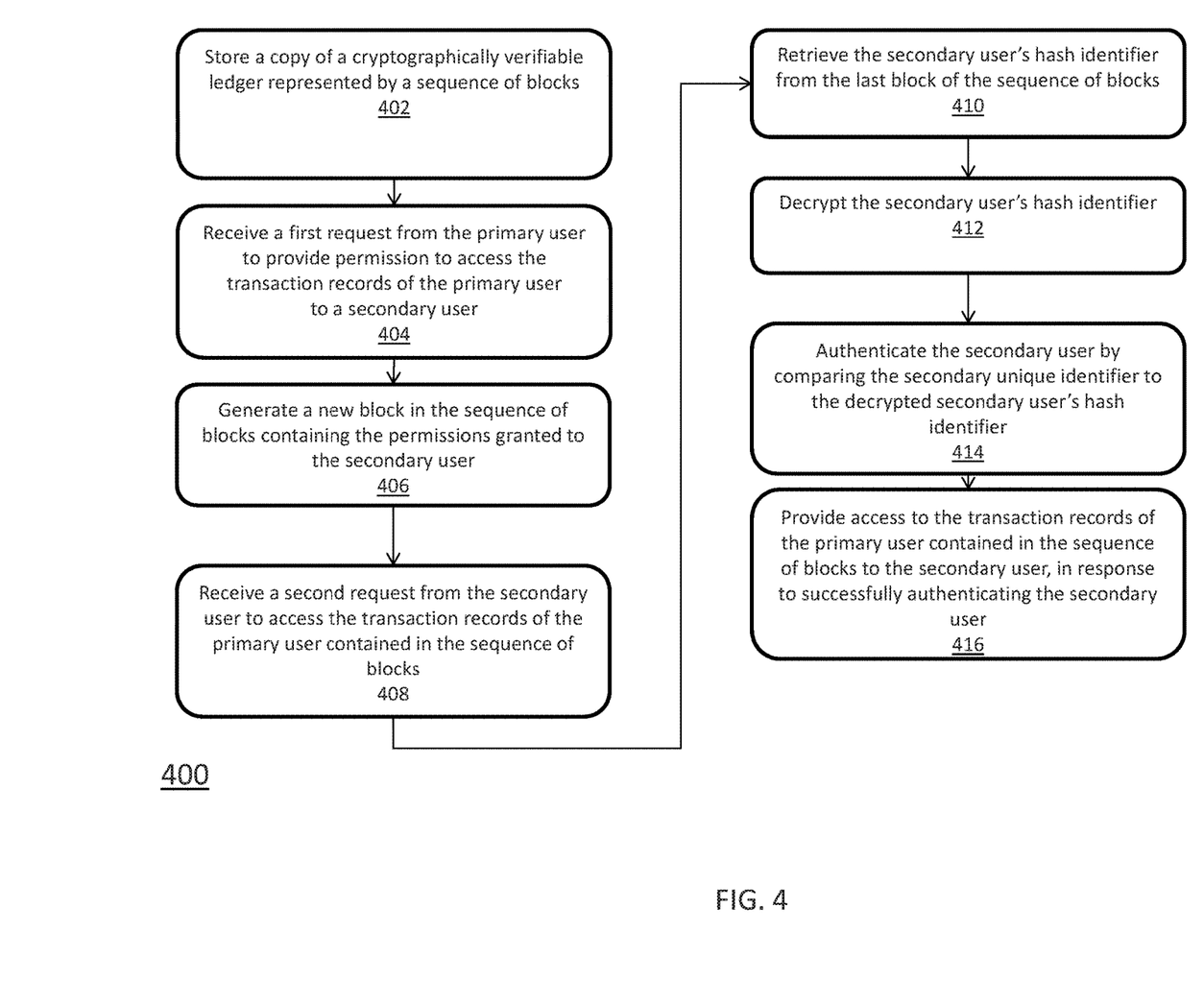
FIG. 4 is a flowchart illustrating a process for authorizing secondary users to access a primary user's account, according to some embodiments.

FIG. 4 is a flowchart 400 illustrating a process for enabling permissions for different users using blockchain. It is to be appreciated that the operations may occur in a different order, and some operations may not be performed. Merely as an example, the flow of data will be described with respect to FIG. 2.

Flowchart 400 begins at operation 402. In operation 402, a backend platform or computing nodes can store a copy of a cryptographically verifiable ledger represented by a sequence of blocks. Each block may contain transaction records of a primary user's account and a hash value associated with a previous block in the sequence of blocks. The transaction records include a primary user's hash identifier. The primary user's hash identifier is generated by encrypting a primary user's unique identifier In operation 404, the account management system may receive a first request from the primary user to provide permission to access the transaction records of the primary user contained in the sequence of blocks to a secondary user.

In operation 406, the account management system may access the cryptographically verifiable ledger to generate a new block in the sequence of blocks containing the permissions granted to the secondary user and a secondary user's hash identifier. The primary user's hash identifier and secondary user's hash identifier is contained in each subsequent block in the sequence of blocks, wherein the secondary user's hash identifier is generated by encrypting a secondary user's unique identifier.

In operation 408, the account management system may receive a second request from the secondary user to access the transaction records of the primary user contained in the sequence of blocks.

In operation 410, the account management system may retrieve the secondary user's hash identifier from the last block of the sequence of blocks.

In operation 412, the account management system may decrypt the secondary user's hash identifier.

In operation 414, the account management system may authenticate the secondary user by comparing the secondary unique identifier to the decrypted secondary user's hash identifier.

In operation 416, the account management system may provide access to the transaction records of the primary user contained in the sequence of blocks to the secondary user, in response to successfully authenticating the secondary user.

Figure 5:
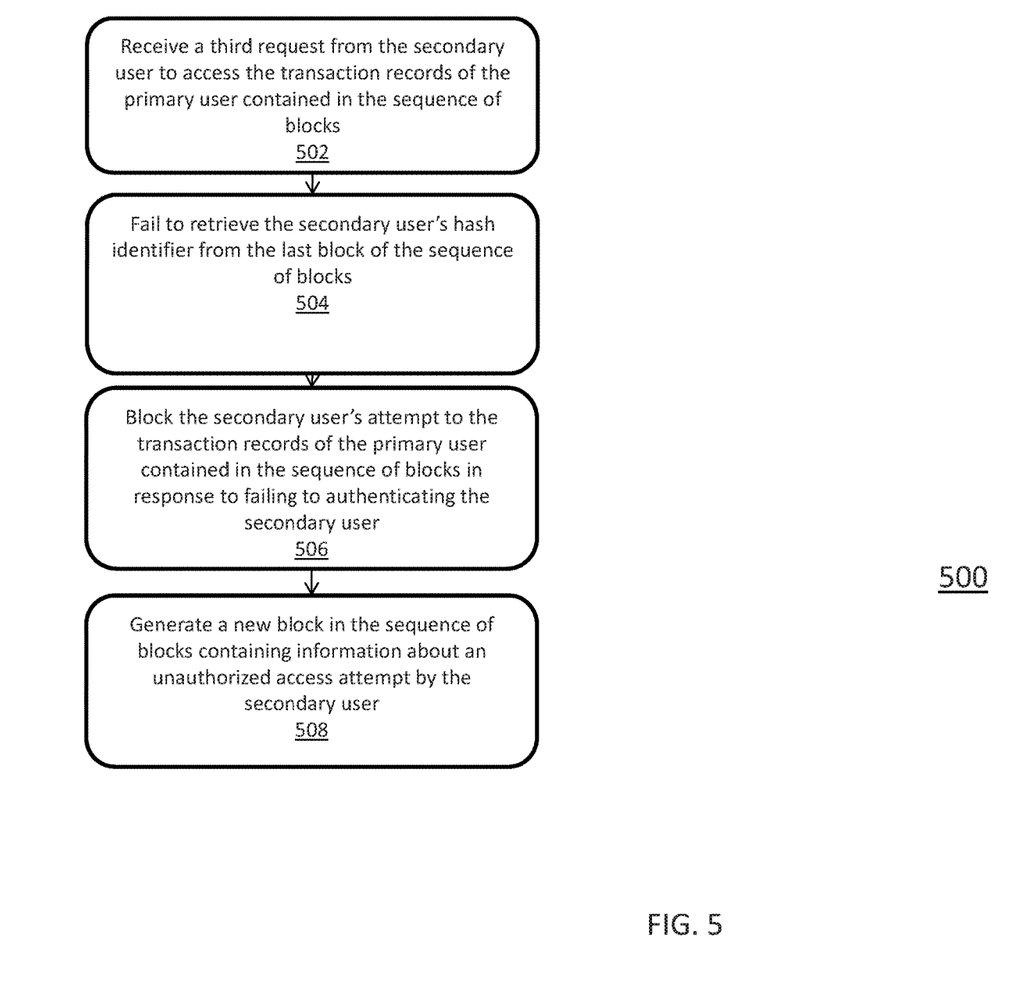
FIG. 5 is a flowchart illustrating a process for preventing a secondary user from accessing a primary user's account, according to some embodiments.

FIG. 5 is a flowchart 500 illustrating a process for a secondary user accessing a primary user's account.

FIG. 5 is a flowchart 500 illustrating a process for preventing a secondary user from accessing a primary user's account. It is to be appreciated that the operations may occur in a different order, and some operations may not be performed. Merely as an example, the flow of data will be described with respect to FIG. 2.

Flowchart 500 starts at operation 502. In operation 502, the account management system may receive a request from the secondary user to access the transaction records of the primary user contained in the sequence of blocks after the time frame indicated by the primary user to provide access to the primary user's account to the secondary user.

In operation 504, the permission layer may fail to retrieve a secondary user hash identifier from the last block of the sequence of blocks. The secondary user's hash identifier may be excluded in the transaction records of the last block of the sequence of blocks due to an action taken by the primary user or due to a time box.

In operation 506, the account engine may block the secondary user's attempt to access the transaction records of the primary user contained in the sequence of blocks, in response to failing to authenticate the secondary user.

In operation 508, the account engine may generate a new block in the sequence of blocks in the blockchain ledger containing information about an unauthorized access attempt by the secondary user. The new block may also include a secondary user hash identifier.

Figure 6:
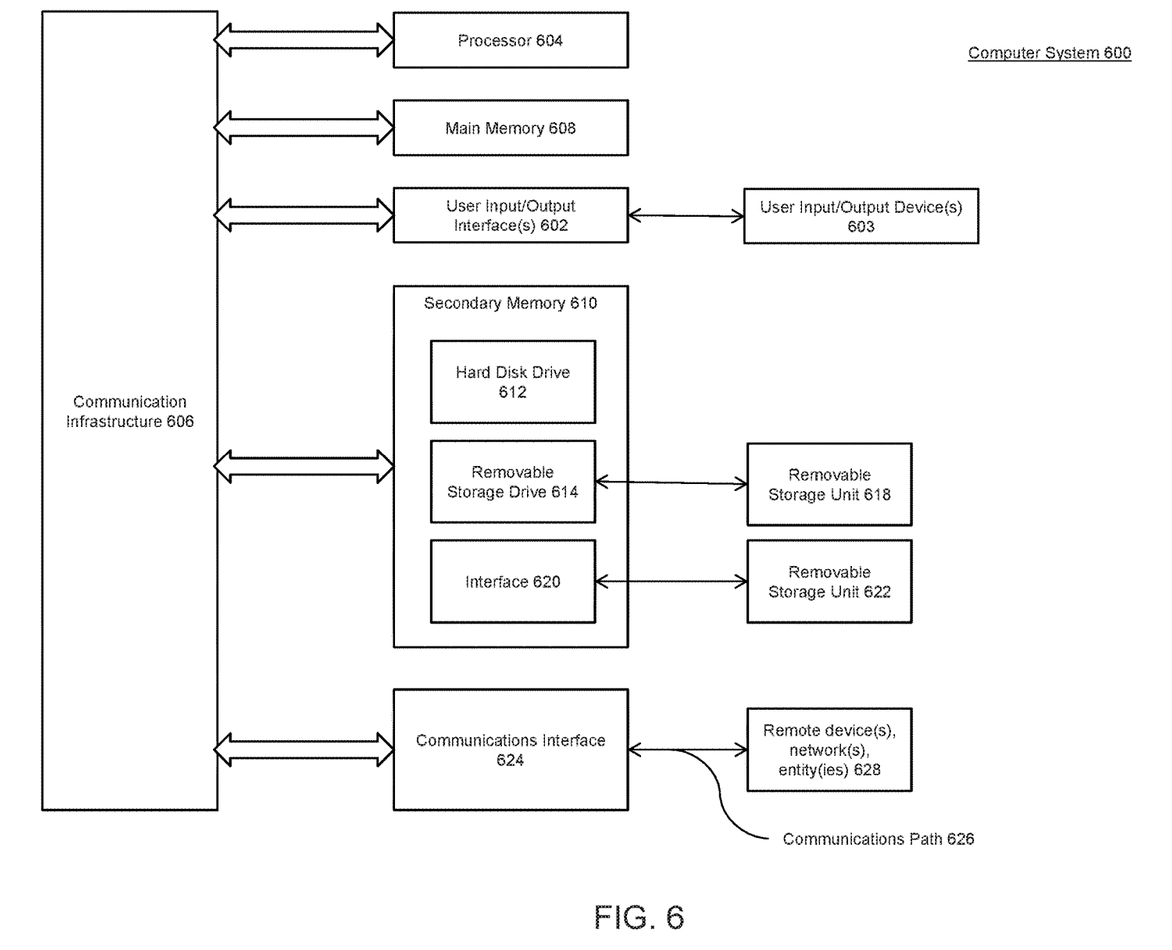
FIG. 6 is a block diagram of example components of a device, according to some embodiments.

FIG. 6 is a block diagram of example components of computer system 600. One or more computer systems 600 may be used, for example, to implement any of the embodiments discussed herein, as well as combinations and sub-combinations thereof. Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612.

Secondary memory 610 may include other means, devices, components, instrumentalities, or other approaches for allowing computer programs and/or other instructions and/or data to be accessed by computer system 600.

Computer system 600 may further include a communications or network interface 624. Communications interface 624 may enable computer system 600 to communicate and interact with any combination of external devices, external networks, external entities, etc. (individually and collectively referenced by reference number 628). For example, communications interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to: remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to: JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer-useable or -readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer, and the cited references that it was made to avoid, may need to be revisited. Further, the Examiner is also reminded that any disclaimer made in the instant application should not be read into or against the parent application.

What is claimed is:

1. A computer-implemented method for enabling access for different users using blockchain, the method comprising:
    storing a copy of a cryptographically verifiable ledger represented by a sequence of blocks corresponding to a primary user, each block of the sequence of blocks containing transaction records of the primary user and a hash value associated with a previous block in the sequence of blocks, wherein the transaction records of the primary user include a hash identifier of the primary user, hash identifier of the primary user is generated by encrypting a unique identifier of the primary user;
    receiving a first request from the primary user to provide, to a secondary user, a permission to access the transaction records of the primary user contained in the sequence of blocks;
    encrypting a unique identifier of the secondary user to generate a hash identifier of the secondary user;
    generating a new block in the sequence of blocks, the new block containing the permission provided to the secondary user and the hash identifier of the secondary user, wherein both the hash identifier of the primary user and the hash identifier of the secondary user are contained in each subsequent block in the sequence of blocks;
    receiving a second request from the secondary user to access the transaction records of the primary user contained in the sequence of blocks in response to the generating of the new block, wherein the second request includes the unique identifier of the secondary user;
    retrieving the hash identifier of the primary user and the hash identifier of the secondary user from a last block of the sequence of blocks in response to the receiving of the second request;
    decrypting the hash identifier of the primary user and the hash identifier of the secondary user retrieved from the last block;
    verifying the primary user by comparing the decrypted hash identifier of the primary user with the unique identifier of the primary user;
    authenticating the secondary user by comparing the unique identifier of the secondary user included in the second request to the decrypted hash identifier of the secondary user;
    providing, to the secondary user, access to the transaction records of the primary user contained in the sequence of blocks, in response to the verifying of the primary user being successful and the authenticating of the secondary user being successful; and
    generating a new last block in the sequence of blocks removing the hash identifier of the secondary user in the new last block, in response to the permission provided to the secondary user being revoked.

2. The method of claim 1, wherein a network of computing nodes store the copy of the cryptographically verifiable ledger.

3. The method of claim 2, wherein authenticating the secondary user further comprises broadcasting to the network of computing nodes an attempt to authenticate the secondary user to verify that the last block including the hash identifier of the secondary user being used to authenticate the secondary user is in fact the unique identifier of the secondary user.

4. The method of claim 1, wherein the first request includes a time frame in which the secondary user may access the transaction records of the primary user contained in the sequence of blocks.

5. The method of claim 4, wherein a block in the sequence of blocks created after the time frame includes a hash value without authentication information associated with the secondary user.

6. The method of claim 5, further comprising:
    receiving a third request from the secondary user to access the transaction records of the primary user contained in the sequence of blocks after the time frame;
    failing to retrieve the hash identifier of the secondary user from the new last block in the sequence of blocks; and
    blocking an attempt of the secondary user to access the transaction records of the primary user contained in the sequence of blocks in response to failing to authenticate the secondary user.

7. The method of claim 6, further comprising generating a second new block in the sequence of blocks containing information about an unauthorized access attempt by the secondary user and the hash identifier of the secondary user.

8. The method of claim 1, wherein the permission includes: read only access or read and write access.

9. A system for enabling access for different users using blockchain, the system comprising:
    a memory;
    a processor in communication with the memory, configured to:
        store a copy of a cryptographically verifiable ledger represented by a sequence of blocks corresponding to a primary user, each block of the sequence of blocks containing transaction records of the primary user and a hash value associated with a previous block in the sequence of blocks, wherein the transaction records of the primary user include a hash identifier of the primary user, the hash identifier of the primary user is generated by encrypting a unique identifier of the primary user;
        receive a first request from the primary user to provide, to a secondary user, a permission to access the transaction records of the primary user contained in the sequence of blocks;
        encrypt a unique identifier of the secondary user to generate a hash identifier of the secondary user;
        generate a new block in the sequence of blocks, the new block containing the permission provided to the secondary user and the hash identifier of the secondary user, wherein both the hash identifier of the primary user and the hash identifier of the secondary user are contained in each subsequent block in the sequence of blocks;
        receive a second request from the secondary user to access the transaction records of the primary user contained in the sequence of blocks in response to the generation of the new block, wherein the second request includes the unique identifier of the secondary user;

retrieve the hash identifier of the primary user and the hash identifier of the secondary user from a last block of the sequence of blocks in response to the receipt of the second request;
decrypt the hash identifier of the primary user and the hash identifier of the secondary user retrieved from the last block;
verify the primary user by comparing the decrypted hash identifier of the primary user with the unique identifier of the primary user;
authenticate the secondary user by comparing the unique identifier of the secondary user included in the second request to the decrypted hash identifier of the secondary user;
provide, to the secondary user, access to the transaction records of the primary user contained in the sequence of blocks, in response to the verification of the primary user being successful and the authentication of the secondary user being successful; and
generate a new last block in the sequence of blocks removing the hash identifier of the secondary user in the new last block, in response to the permission provided to the secondary user being revoked.

10. The system of claim 9, wherein a network of computing nodes store the copy of the cryptographically verifiable ledger.

11. The system of claim 10, wherein the processor is further configured to broadcast to the network of computing nodes an attempt to authenticate the secondary user to verify that the last block including the hash identifier of the secondary user being used to authenticate the secondary user is in fact the unique identifier of the secondary user.

12. The system of claim 9, wherein the first request includes a time frame in which the secondary user may access the transaction records of the primary user contained in the sequence of blocks.

13. The system of claim 12, wherein a block in the sequence of blocks created after the time frame includes a hash value without authentication information associated with the secondary user.

14. The system of claim 13, wherein the processor is further configured to:
receive a third request from the secondary user to access the transaction records of the primary user contained in the sequence of blocks after the time frame;
fail to retrieve the hash identifier of the secondary user from the new last block in the sequence of blocks; and
block an attempt of the secondary user to access the transaction records of the primary user contained in the sequence of blocks in response to failing to authenticate the secondary user.

15. The system of claim 14, wherein the processor is further configured to generate a second new block in the sequence of blocks containing information about an unauthorized access attempt by the secondary user and the hash identifier of the secondary user.

16. The system of claim 9, wherein the permission includes: read only access or read and write access.

17. A non-transitory computer-readable medium storing instructions that when executed by one or more processors of a device cause the one or more processors to:
store a copy of a cryptographically verifiable ledger represented by a sequence of blocks corresponding to a primary user, each block of the sequence of blocks containing transaction records of the primary user and a hash value associated with a previous block in the sequence of blocks, wherein the transaction records of the primary user include a hash identifier of the primary user, the hash identifier of the primary user is generated by encrypting a unique identifier of the primary user;
receive a first request from the primary user to provide, to a secondary user, a permission to access the transaction records of the primary user contained in the sequence of blocks;
encrypt a unique identifier of the secondary user to generate a hash identifier of the secondary user;
generate a new block in the sequence of blocks, the new block containing the permission provided to the secondary user and the hash identifier of the secondary user, wherein both the hash identifier of the primary user and the hash identifier of the secondary user are contained in each subsequent block in the sequence of blocks;
receive a second request from the secondary user to access the transaction records of the primary user contained in the sequence of blocks in response to the generation of the new block, wherein the second request includes the unique identifier of the secondary user;
retrieve the hash identifier of the primary user and the hash identifier of the secondary user from a last block of the sequence of blocks in response to the receipt of the second request;
decrypt the hash identifier of the primary user and the hash identifier of the secondary user retrieved from the last block;
verify the primary user by comparing the decrypted hash identifier of the primary user with the unique identifier of the primary user;
authenticate the secondary user by comparing the unique identifier of the secondary user included in the second request to the decrypted hash identifier of the secondary user; and
provide, to the secondary user, access to the transaction records of the primary user contained in the sequence of blocks, in response to the verification of the primary user being successful and the authentication of the secondary user being successful; and
generate a new last block in the sequence of blocks removing the hash identifier of the secondary user in the new last block, in response to the permission provided to the secondary user being revoked.

18. The medium of claim 17, wherein a network of computing nodes store the copy of the cryptographically verifiable ledger.

19. The medium of claim 18, wherein the instructions when executed cause the one or more processors to broadcast to the network of computing nodes an attempt to authenticate the secondary user to verify that the last block including the hash identifier of the secondary user being used to authenticate the secondary user is in fact the unique identifier of the secondary user.

20. The medium of claim 19, wherein the instructions when executed cause the one or more processors to:
receive a third request from the secondary user to access the transaction records of the primary user contained in the sequence of blocks after a specified time frame included in the permission;
fail to retrieve the hash identifier of the secondary user from the new last block in the sequence of blocks; and
block an attempt of the secondary user to access the transaction records of the primary user contained in the sequence of blocks in response to failing to authenticate the secondary user.

* * * * *